Sept. 16, 1958  E. S. SHEPARD, SR  2,852,243
MAGNETIC ACCELEROMETER
Filed Nov. 17, 1953

EDWARD S. SHEPARD, SR.,
INVENTOR.

BY

United States Patent Office 2,852,243
Patented Sept. 16, 1958

2,852,243

MAGNETIC ACCELEROMETER

Edward S. Shepard, Sr., Phoenix, Ariz., assignor to The Garrett Corporation, Los Angeles, Calif., a corporation of California Application November 17, 1953, Serial No. 392,647

7 Claims. (Cl. 264—1)

This invention relates generally to apparatus for measuring the acceleration of a moving body, and particularly relates to an accelerometer utilizing magnetic spring action.

Accelerometers are conventionally used for measuring vibration or acceleration of a moving body such, for example, as an aircraft. To this end a suspended mass is moved by the acceleration of the body against the force of a mechanical spring. The actual movement or position of the mass may be indicated by an electric circuit. Alternatively, movements of the mass may vary the reluctance of a magnetic circuit. Since prior accelerometers usually require a spring, they are subject to the usual disadvantages of springs such as hysteresis. Furthermore, the characteristics of a spring will change under widely varying temperature conditions to which aircraft may be subjected.

Usually the mass which indicates or measures acceleration must be damped, and to this end it is conventional practice to immerse the moving mass in a viscous fluid such as oil. The oil used for damping purposes will expand or contract when the temperature icnreases or decreases so that provision must be made for the varying volume of the damping oil. Furthermore, the viscosity of oil or any other viscous fluid is dependent, more or less, on the temperature and, consequently, the damping factor becomes a function of temperature.

It is, accordingly, an object of the present invention to provide an improved accelerometer which does not require mechanical springs and which does not need to be damped by a viscous fluid.

A further object of the present invention is to provide a device for measuring the acceleration of a moving body which will operate under widely varying temperature conditions without change of its sensitivity or of its damping factor.

Another object of the invention is to provide improved apparatus for measuring acceleration of a moving body, wherein the damping factor may readily be adjusted to suit various conditions.

The accelerometer of the present invention makes use of magnetic spring action. To this end a permanent magnet is suspended to be freely movable in one plane. This plane intersects one or preferably two further permanent magnets which are fixed. The poles of the permanent magnets are arranged so that the movable magnet is repelled by the fixed magnets. In other words, each pole of the movable magnet faces a pole of the same polarity of the two fixed magnets. Consequently, the movable magnet is suspended in space by the force of the magnetic fields developed between the movable and the fixed magnets. Preferably, the movable magnet is guided to permit only movement within the plane which intersects all three magnets and, accordingly, the movable magnet will be responsive to a component of acceleration of the body within its plane of movement.

The accelerometer of the present invention is preferably damped electromagnetically. To this end, a winding is provided for each of the fixed magnets and the ends of each of the two windings are connected together, preferably through variable resistors. Thus, the currents induced in the windings will damp movements of the movable magnet.

Means may be associated with the magnets for developing an electric signal representative of the instantaneous position of the movable magnet with respect to one of the fixed magnets.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
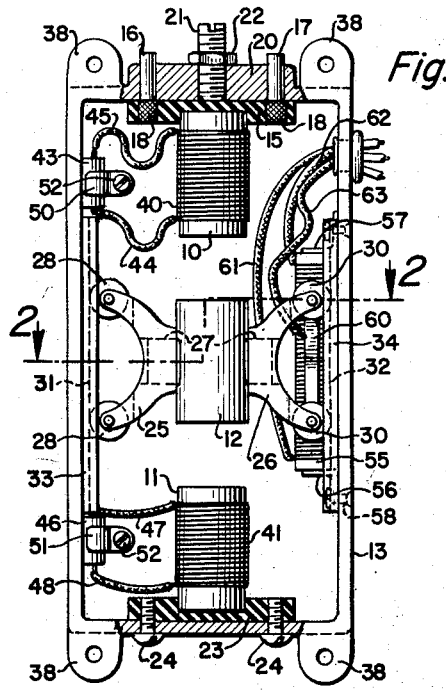
Fig. 1 is an elevational view, partly in section, of an accelerometer mechanism embodying the present invention.
Figure 2:
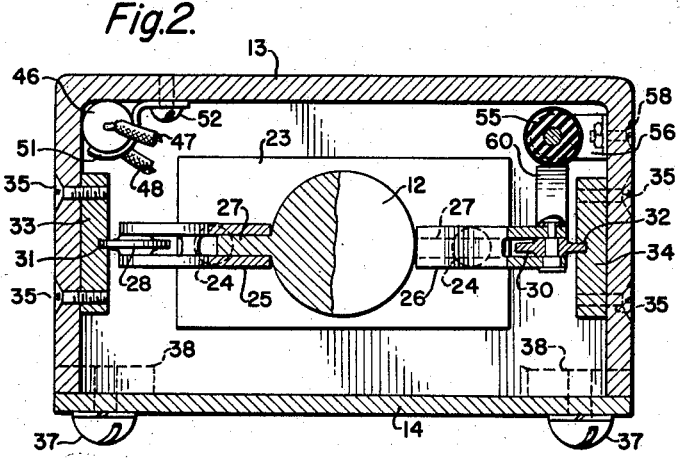
Fig. 2 is a sectional view on an enlarged scale, taken on line 2—2 of Fig. 1, of the accelerometer of the invention.

Referring now to the drawing and particularly to Figs. 1 and 2, there is illustrated an accelerometer embodying the invention and including two fixed magnets 10 and 11 and a movable magnet 12. The magnets 10, 11 and 12 may, for example, be of cylindrical shape, as shown, and preferably are permanent magnets which may consist, for example, of Alnico. Magnets 10 and 11 are secured to an open-faced housing 13 having a cover plate 14 and the housing and its cover plate consist of non-magnetic material such, for example, as aluminum or copper. The permanent magnet 10 is secured in any suitable manner to a block 15 which may consist of a plastic material and in which are secured guide pins 16, 17 having knurled heads 18 so that they are fixed to the block 15. The guide pins 16 and 17 extend through suitable openings in a block 20 which may form part of the housing 13. A swiveling screw 21 having a lock nut 22 is attached to the block 15 and threaded through the block 20 to adjust the block 15 and thereby the permanent magnet 10 with respect to the housing.

The permanent magnet 11 is fastened to a block 23, which is secured to the bottom portion of the housing by screws 24. Thus, the permanent magnet 11 is fixed, while the permanent magnet 10 is adjustable with respect to the magnet 11.

The movable magnet 12 is guided by suitable guide means to permit movement thereof within a plane intersecting the three magnets 10, 11 and 12 and about which they are disposed symmetrically. To this end there are provided two carriages 25 and 26 which are secured to tabs 27 extending from opposite sides of the magnet 12 within the plane of its movement. The carriages 25 and 26 are each provided with a pair of guide rollers 28 and 30, which are disposed for movement in respective guide grooves 31 and 32 provided in guide strips 33 and 34. The two guide strips 33 and 34 are secured by screws 35 to opposite side walls of the housing. Thus it will be seen that magnet 12 is free to move in a plane intersecting the guide grooves 31 and 32. The front cover 14 may be secured to the housing 13 by means of screws 37 threaded through suitable openings in ears 38 extending from or integral with the housing 13.

In accordance with the present invention, movements of the movable magnet 12 are damped by electromagnetic means. To this end a winding 40 is disposed about the permanent magnet 10 and another winding 41 is wound about the permanent magnet 11. Preferably, a damping resistor 43 is connected by means of conductors 44 and 45 across the terminals of winding 40, while another damping resistor 46 is connected by conductors 47 and 48 across the winding 41. These damping resistors serve the purpose of providing damping of the movements of the movable magnet as will be more fully explained hereinafter. Each of the resistors 43 and 46 is secured to the housing 13 by respective lugs 50 and 51 which are fastened to the housing by screws 52.

For the purpose of providing an electric output signal representative of the position of the movable magnet 12 with respect to one of the fixed magnets 10 and 11, there may be provided a potentiometer 55. The potentiometer 55 may, for example, consist of a resistance card, that is, a card about which a resistive wire has been wound. The potentiometer 55 may also be secured to the housing by lugs 56 and 57 which are secured to the housing by screws 58. A slider 60 is secured to the carriage 26 so that its end bears against the potentiometer 55. A pair of conductors 61 and 62 is connected to the terminals of the potentiometer 55. The conductor 63 is electrically connected to the slider 60 and is sufficiently long to follow the movements of the carriage 26 in response to movements of the magnet 12.

Figure 3:
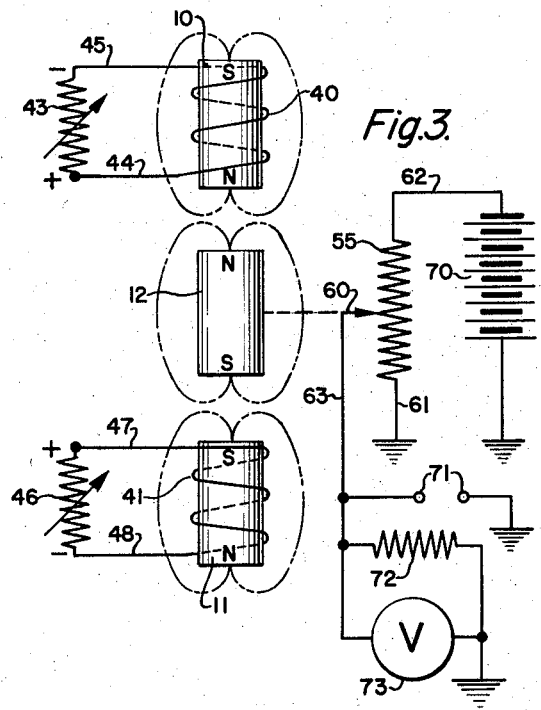
Fig. 3 is a schematic diagram of the magnetic circuit of the accelerometer of Fig. 1 and of the electric output circuit of the instrument.

The operation of the accelerometer will now be explained by reference to Fig. 3. As shown in Fig. 3, the north pole of the fixed magnet 10 faces the north pole of the movable magnet 12. Similarly, the south pole of the fixed magnet 11 faces the south pole of the movable magnet 12. Accordingly, the fixed magnets 10 and 11 tend to repel the movable magnet 12, and in the absence of any external force the movable magnet 12 will be equally spaced from the fixed magnets 10 and 11. When the housing 13 is now accelerated in the direction of the plane within which the magnet 12 moves or when the housing is accelerated so that it has a component of acceleration within this plane, the magnet 12 will move either toward the fixed magnet 10 or toward the magnet 11 depending upon the direction of acceleration. Due to the provision of the carriages 25 and 26 and their guide rollers, the magnet 12 can only move within one plane.

As soon as the magnet 12 moves toward one of the two fixed magnets 10 or 11, the repulsion will be increased and, at the same time, currents are induced in the windings 40 and 41. Since the windings 40 and 41 are electrically connected in series opposing relationship, these induced currents will tend to further repel the moving magnet 12. The amount of damping thus obtained is controlled by the resistance of the resistors 43 and 46, through which the induced currents must flow. Thus, by varying the resistance of the resistors 43 and 46 or by substituting other resistors having a different value of resistance the damping factor may readily be adjusted.

It will, of course, be understood that the magnetic forces are inversely proportional to the square of the separation distance between the movable and fixed magnets so that the actual movement of the magnet 12 will not generally be a linear function of the acceleration forces. The actual relationship between the movement of the magnet 12 and the acceleration forces depends on whether the magnetic field developed by the three magnets is homogeneous or not. Depending on the amount of damping provided, the initial movement of the magnet 12 caused by the acceleration will be damped more or less rapidly.

Preferably, an electric output signal is obtained which is representative of the position of the movable magnet 12 with respect to one of the fixed magnets 10 or 11. This may be done in various conventional ways, for example, by providing an additional winding about either one of fixed magnets 10 or 11 and by indicating the induced current in such an additional winding. As shown in Fig. 3, the electric output signal may be obtained by means of a potentiometer. The slider 60 moves with respect to the fixed potentiometer 55 in unison with movements of the magnet 12. An electric output signal may readily be obtained by connecting a source of voltage such as a battery 70 across the potentiometer 55. One terminal of the source 70 and the lead or conductor 61 may be grounded and an output signal may be obtained between the output lead 63 connected to the slider 60 and ground, as schematically indicated by the output winding 71. Alternatively, the voltage across a resistor 72 connected between output lead 63 and ground may be measured by a voltmeter 73. It is, of course, to be understood that the output voltage may be amplified in a conventional manner before it is indicated or otherwise used.

In order to obtain a direct and linear relationship between the output signal or voltage and the acceleration forces, it may be desirable to wind the potentiometer 55 in a non-linear manner. In other words, the potentiometer 55 may be wound in such a manner that the magnitude of the output voltage will be a linear function of the accleration forces. As explained hereinbefore, if the magnetic field is not homogeneous, there may be a different relationship between the movement of the magnet 12 and the accelerating forces which cause such a movement.

It will be understood that under some conditions magnet 10 may be omitted. In that case the housing 13 should be mounted so that the force of gravity acts downwardly in Fig. 1. In that case, the gravity will tend to pull movable magnet 12 downwards until it is repelled by the forces of the magnetic field. Thus, only one fixed and one movable magnet need be provided in that case.

Thus, the accelerometer of the invention makes use of magnetic spring action and hence does not require a mechanical spring. Furthermore, since damping is effected electromagnetically, there is no need for a damping oil. As a result, the instrument of the present invention will operate within a wide temperature range which may be of the order of −100° F. to +250° F. The natural frequency of the accelerometer is determined by the strength of the magnets 10, 11 and 12 and may be of the order of from less than three to 100 or more cycles per second. Furthermore, the electromagnetic damping ratio may be selected within wide limits depending on the inductance of windings 40 and 41 and the resistance of resistors 43 and 46. The weight of the accelerometer is fairly low and may amount to approximately 10 to 12 ounces.

What is claimed is:

1. A device for sensing the acceleration of a moving body comprising a first, a second and a third permanent magnet, each having opposite poles, said first and said second magnet being secured to said body in spaced apart relationship, said third magnet being movably disposed between said first and second magnets, said magnets being arranged so that each of the poles of said third magnet faces respectively a pole of the same polarity of said first and of said second magnet, a first damping inductor associated with said first magnet, a second damping inductor associated with said second magnet, conductor means for electrically connecting said inductors in a closed series circuit for conducting current induced in said inductors by movement of said third magnet, the magnetic flux change resulting from said induced current tending to increase the flux of the one of said first and second magnets toward which said third magnet moves and to decrease the flux of the other of said first and second magnets whereby movement of said third magnet in response to acceleration of the body is damped by the currents induced in said inductors, and means associated with said magnets for developing an electric output signal representative of the instantaneous position of said third magnet with respect to said first magnet.

2. A device for sensing the acceleration of a moving body comprising a first, a second and a third permanent magnet, each have opposite poles, said first and said second magnet being secured to said body in spaced apart relationship, said third magnet being movably disposed between said first and second magnet, said magnets being arranged so that each of the poles of said third magnet faces respectively a pole of the same polarity of said first and of said second magnet, a first winding associated with said first magnet, a second winding associated with said second magnet, a damping impedance element connected across one of said windings, conductor means for electrically connecting said windings in a closed series circuit for conducting current induced in said windings by movement of said third magnet, the magnetic flux change resulting from said induced current tending to change the magnetic flux so as to increase the flux of the one of said first and second magnets toward which said third magnet moves and to decrease the flux of the other of said first and second magnets whereby movement of said third magnet in response to acceleration of the body is damped by the currents induced in said windings, and potentiometer means connected to said third magnet for developing an output voltage representative of the instantaneous position of said third magnet with respect to said first magnet.

3. A device for sensing the acceleration of a moving body comprising a first, a second and a third permanent magnet, each having opposite poles, said first and said second magnet being secured to said body in spaced apart relationship, said third magnet being movably disposed between said first and second magnet, said magnets being arranged so that each of the poles of said third magnet faces respectively a pole of the same polarity of said first and of said second magnet, a first winding associated with said first magnet, a second winding associated with said second magnet, a damping resistor connected across one of said windings, conductor means for electrically connecting said windings in a closed series circuit for conducting current induced in said windings by movement of said third magnet, the magnetic influx change resulting from said induced current tending to increase the flux of the one of said first and second magnets toward which said third magnet moves and to decrease the flux of the other of said first and second magnets whereby movement of said third magnet in response to acceleration of the body is damped by the currents induced in said winding, a second resistor, a source of voltage connected across said second resistor, a movable slider connected to said third magnet and movable over said second resistor, and an output circuit coupled between said slider and one terminal of said second resistor for developing an output voltage representative of the instantaneous position of said third magnet with respect to said first magnet.

4. A device for sensing the acceleration of a moving body comprising a first, a second and a third permanent magent, each having opposite poles, said first and said second magnet being secured to said body and being disposed symmetrically with respect to a predetermined plane intersecting said magnets and in spaced apart relationship, means connected to said third magnet for permitting it to move within said plane and between said first and said second magnet, said magnets being arranged so that each of the poles of said third magnet faces respectively a pole of the same polarity of said first and second magnet, a first winding associated with said first magnet, a second winding associated with said second magnet, a damping resistor connected across one of said windings, conductor means for electrically connecting said windings in a closed series circuit for conducting current induced in said windings by movement of said third magnet, the magnetic flux change resulting from said induced current tending to increase the flux of the one of said first and second magnets toward which said third magnet moves and to decrease the flux of the other of said first and second magnets whereby movement of said third magnet in response to a component of acceleration of the body within said plane is damped by the currents induced in said windings, and means associated with said magnets for developing an electric signal representative of the instantaneous position of said third magnet with respect to said first magnet.

5. An instrument for sensing the acceleration of a moving body comprising a housing of non-magnetic material, a first, a second and a third permanent magnet, each having opposite poles, said first and said second magnet being secured to opposite ends of said housing, said first and said second magnet being disposed symmetrically with respect to a predetermined plane intersecting said magnets, guide means in said housing and connected to said third magnet for permitting movement thereof within said plane and between said first and said second magnet, said magnets being arranged so that each of the poles of said third magnet faces respectively a pole of the same polarity of said first and of said second magnet, a first winding associated with said first magnet, a second winding associated with said second magnet, a damping resistor connected across one of said windings, conductor means for electrically connecting said windings in a closed series circuit for conducting current induced in said windings by movement of said third magnet, the magnetic flux change resulting from said induced current tending to increase the flux of the one of said first and second magnets toward which said third magnet moves and to decrease the flux of the other of said first and second magnets whereby movement of said third magnet in said plane in response to a component of acceleration of the body within said plane is damped by the currents induced in said windings, and means coupled to said magnets for developing an electric output signal representative of the instantaneous position of said third magnet with respect to said first magnet.

6. An instrument for sensing the acceleration of a moving body comprising a housing of non-magnetic material, a first, a second and a third permanent magnet, each having opposite poles, said first and said second magnet being secured to opposite ends of said housing, said first and said second magnet being disposed symmetrically with respect to a predetermined plane intersecting said magnets, guide means in said housing and connected to said third magnet for permitting movement thereof within said plane and between said first and said second magnet, said magnets being arranged so that each of the poles of said third magnet faces respectively a pole of the same polarity of said first and of said second magnet, a first winding associated with said first magnet, a second winding associated with said second magnet, a damping resistor connected across one of said windings, a conductor for electrically connecting said windings in a closed series circuit for conducting current induced in said windings by movement of said third magnet, the magnetic flux change resulting from said induced current tending to increase the flux of the one of said first and second magnets toward which said third magnet moves and to decrease the flux of the other of said first and second magnets whereby movement of said third magnet in said plane in response to a component of acceleration of the body within said plane is damped by the currents induced in said windings, an output resistor in said housing, a source of voltage connected across said output resistor, a movable slider connected to said third magnet and movable over said output resistor, and an output circuit coupled between said slider and one terminal of said output resistor for developing an output voltage representative of the instantaneous position of said third magnet with respect to said first magnet.

7. A device for sensing the acceleration of a body comprising: a first, a second, and a third magnet, each having opposite poles, said first and said second magnets being secured to said body in spaced apart relationship, said third magnet being movably disposed between said first and second magnets, said magnets being arranged so that each of the poles of said third magnet faces respectively a pole of the same polarity of said first and of said second magnet, a damping inductor associated with one of said magnets, conductor means for electrically connecting said inductor in a closed series circuit for conducting current induced in said inductor by movement of said third magnet, the magnetic flux change resulting from said induced current tending to increase the flux of the one of said first and second magnets toward which said third magnet moves and to decrease the flux of the one of said first and second magnets upon movement of said third magnet away from said one magnet, whereby movement of said third magnet in response to acceleration of the body is damped by the current induced in said inductor, and means associated with said magnets for providing an electric output signal representative of the instantaneous position of said third magnet with respect to said first magnet.

References Cited in the file of this patent

UNITED STATES PATENTS

| | | |
|---|---|---|
| 2,315,408 | Faus | Mar. 30, 1943 |
| 2,340,781 | Wagner | Feb. 1, 1944 |
| 2,342,141 | Hansen | Feb. 22, 1944 |
| 2,484,165 | Hathaway | Oct. 11, 1949 |
| 2,640,900 | Klose | June 2, 1953 |
| 2,695,165 | Hansen | Nov. 23, 1954 |

FOREIGN PATENTS

| | | |
|---|---|---|
| 539,409 | Great Britain | Sept. 9, 1941 |
| 340,841 | Germany | Sept. 19, 1921 |

UNITED STATES PATENT OFFICE
CERTIFICATE OF CORRECTION

Patent No. 2,852,243　　　　　　　　　　　　　　　September 16, 1958

Edward S. Shepard, Sr.

It is hereby certified that error appears in the printed specification of the above numbered patent requiring correction and that the said Letters Patent should read as corrected below.

Column 1, line 36, for "icnreases" read -- increases --; column 4, line 20, for "accleration" read -- acceleration --; line 74, for "have" read -- having --; column 5, line 37, for "influx" read -- flux --; line 54, for "magent" read -- magnet --.

Signed and sealed this 6th day of January 1959.

(SEAL)
Attest:

KARL H. AXLINE
Attesting Officer

ROBERT C. WATSON
Commissioner of Patents